United States Patent
Flagg

(10) Patent No.: US 6,445,378 B1
(45) Date of Patent: Sep. 3, 2002

(54) MOUSE PAD FOR INITIATING OR CONTROLLING SOFTWARE APPLICATIONS

(76) Inventor: William F Flagg, 2338 Fourteenth St., #3, Boulder, CO (US) 80304

( * ) Notice: Subject to any disclaimer, the term of this patent is extended or adjusted under 35 U.S.C. 154(b) by 0 days.

(21) Appl. No.: 09/257,755

(22) Filed: Feb. 25, 1999

(51) Int. Cl.[7] .................................................. G09G 5/00
(52) U.S. Cl. ...................... 345/163; 345/173; 345/156; D14/458
(58) Field of Search ................................ 345/156–157, 345/163–166, 173–183; 248/918; 178/18.01–18.11, 19.01–19.07; 434/317; D14/458; 463/37–38; 200/5 A, 5 R, 510–520

(56) References Cited

U.S. PATENT DOCUMENTS

| | | | | |
|---|---|---|---|---|
| 4,078,257 A | * | 3/1978 | Bagley | 364/709 |
| 4,892,981 A | * | 1/1990 | Soloway et al. | 200/5 A |
| 5,810,604 A | * | 9/1998 | Kopp, Jr. et al. | 434/317 |
| 5,831,597 A | * | 11/1998 | West et al. | 345/163 |
| 5,876,010 A | * | 3/1999 | Murphy | 248/918 |
| 5,877,748 A | * | 3/1999 | Redlich | 345/163 |
| 6,037,928 A | * | 3/2000 | Nachirson et al. | 345/156 |

OTHER PUBLICATIONS the launch station™ (Patents–Pending–1997), from Internet web site: www.imageworksmfg.com, pp. 1–5.
Launch Station™ for Desktop PCs—User's Guide, Issue 1.1, Sep. 1998, Imageworks Mfg., Inc., pp. 1–20.

* cited by examiner

Primary Examiner—Lun-Yi Lao

(57) ABSTRACT

A mouse pad for a computer system capable of loading, initiating, or running a computer program includes buttons or switches embedded in the mouse pad and which do not extend above the top surface of the mouse pad. The mouse pad is connected to a computer via the computer's keyboard port such that the buttons or switches, upon activation or depression, can be used as or like programmable function keys to initiate, control, launch, load, or run a software program or other application on a computer system.

33 Claims, 7 Drawing Sheets

MOUSE PAD FOR INITIATING OR CONTROLLING SOFTWARE APPLICATIONS

BACKGROUND OF THE INVENTION

1. Field of the Invention

The present invention is directed to a computer mouse pad and, more specifically, to a computer mouse pad that can be used to launch, or initiate, control, or run computer software applications or functions without inhibiting use of a computer mouse.

2. Description of the Prior Art

The growth in popularity of the Microsoft Windows™ operating system and other operating systems or graphical user interfaces for computers has promoted widespread adoption and use of a computer mouse and mouse pad to provide input to the computers and to control loading and use of software programs. A computer mouse is usually used in conjunction with a computer mouse pad that is positioned on a desk top or other surface on which the mouse is used in a position that is easily accessible by the computer user. The computer mouse pad can provide the desired soft surface with sufficient friction to ensure the roller ball rolls in a mechanical mouse. The mouse pad can also protect the desk top from scratches as well as protecting the computer mouse from contaminants which might be present on the desk top. The computer mouse pad can be made of foam rubber, rubber, plastic, nylon, or other material. Typical computer mouse pads include a thick pad body of substantially uniform thickness with a flat top working surface upon which the computer mouse is positioned.

Unfortunately, most computer mouse pads are passive devices that provide little, if any, assistance to a user in launching, loading, controlling, or initiating a software program. One possible exception to this general rule is The Launch Station™ device, manufactured by Imageworks Manufacturing, Inc., of Park Forest, Ill., U.S.A., and which includes a rigid computer mouse support surface and buttons extending upward from the surface that can be used to run and access computer programs. The Launch Station™ device attaches to a conventional computer keyboard and into the keyboard port of a computer. Unfortunately, The Launch Station™ device has a rigid structure that limits is aesthetic appeal and usefulness. Therefore, there remains a need for a mouse pad that is structurally more aesthetically pleasing and more useful and that can be used to initiate, load, or run software programs on a computer system. Preferably the mouse pad does not hinder or limit conventional use or movement of a computer mouse on the mouse pad while allowing the strategic placement of buttons or switches within the usable area of the mouse pad.

SUMMARY OF THE INVENTION

Accordingly, an object of the present invention is to provide a mouse pad for a computer.

Another object of the present invention is to provide an apparatus for launching, loading, controlling, operating, or initiating a computer program on a computer.

An additional object of the present invention is to provide a mouse pad that can be used to facilitate and enhance strategic placement of advertising and graphic material directed to a user of the mouse pad.

Yet another object of the present invention is to provide a mouse pad that does not hinder or inhibit use of a conventional computer mouse.

Still another object of the present invention is to provide a mouse pad that can appear to a computer or computer system as having programmable function keys or buttons.

Yet another object of the present invention is to allow strategic placement of buttons or switches anywhere on a mouse pad.

A further object of the present invention is to provide a mouse pad that is flexible, durable and resistant to damage from liquids spilled or placed on it.

Additional objects, advantages, and novel features of the invention will be set forth in part in the description that follows, and in part will become apparent to those people skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, an attachment to a computer, includes a flexible mouse pad having at least one button and a keyboard, the button and the keyboard being electrically connected to a keyboard port on the computer such that depression of the button appears as a keyboard stroke to the computer.

In addition to the above and also to achieve the foregoing and other objects and in accordance with the purposes of the present invention, as embodied and broadly described herein, a mouse pad includes a base layer; a first layer coupled to the base layer and including a first electrically conductive strip and a second electrically conductive strip; a second layer having at least one opening extending through it, the second layer being coupled to the first layer such that the opening is positioned over at least a portion of the first conductive strip and at least a portion of the second conductive strip; and a third layer having at least one electrically conductive region, the third layer coupled to the second layer such that at least a portion of the conductive region of the third layer is positioned over or adjacent at least a portion of the opening of the second layer, wherein upon application of at least a threshold pressure to the conductive region of the third layer, such that the conductive region of the third layer is moved toward the first layer, the conductive region of the third layer extends at least partially through the opening in the second layer and contacts both the first conductive strip and the second conductive strip.

In addition to the above and also to achieve the foregoing and other objects and in accordance with the purposes of the present invention, as embodied and broadly described herein, an attachment to a computer includes a mouse pad having a flat top surface and at least one depressible portion, said mouse pad being electrically connected to a keyboard and a keyboard port on the computer such that depression of the at least one depressible portion creates a first signal to the computer or the keyboard port and depression of a key on the keyboard creates a second signal to the computer on the keyboard port.

In addition to the above and also to achieve the foregoing and other objects and in accordance with the purposes of the present invention, as embodied and broadly described herein, an apparatus includes a pad having a substantially flat top surface, the pad including at least two electrically conductive areas and a first switch means for electrically connecting the two electrically conductive areas when a force greater than or equal to a threshold force is exerted on at least a portion of the top surface such that at least a portion of the top surface is directed toward the two electrically conductive areas.

In addition to the above and also to achieve the foregoing and other objects and in accordance with the purposes of the present invention, as embodied and broadly described herein, a mouse pad includes an initial layer, said initial layer including a first electrically conductive strip and a second electrically conductive strip; a barrier coupled to the initial layer; and a secondary layer coupled to the barrier and having at least one electrically conductive region, the secondary layer coupled to the barrier such that the electrically conductive region of the secondary layer is positioned over, but separated apart from, the first electrically conductive strip and the second electrically conductive strip of the initial layer such that a space is created between the initial layer and the secondary layer, wherein upon application of at least a threshold pressure to the conductive region of the secondary layer, such that the conductive region of the secondary layer is moved toward the initial layer, the conductive region of the secondary layer extends at least partially through the space and contacts both the first conductive strip and the second conductive strip.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
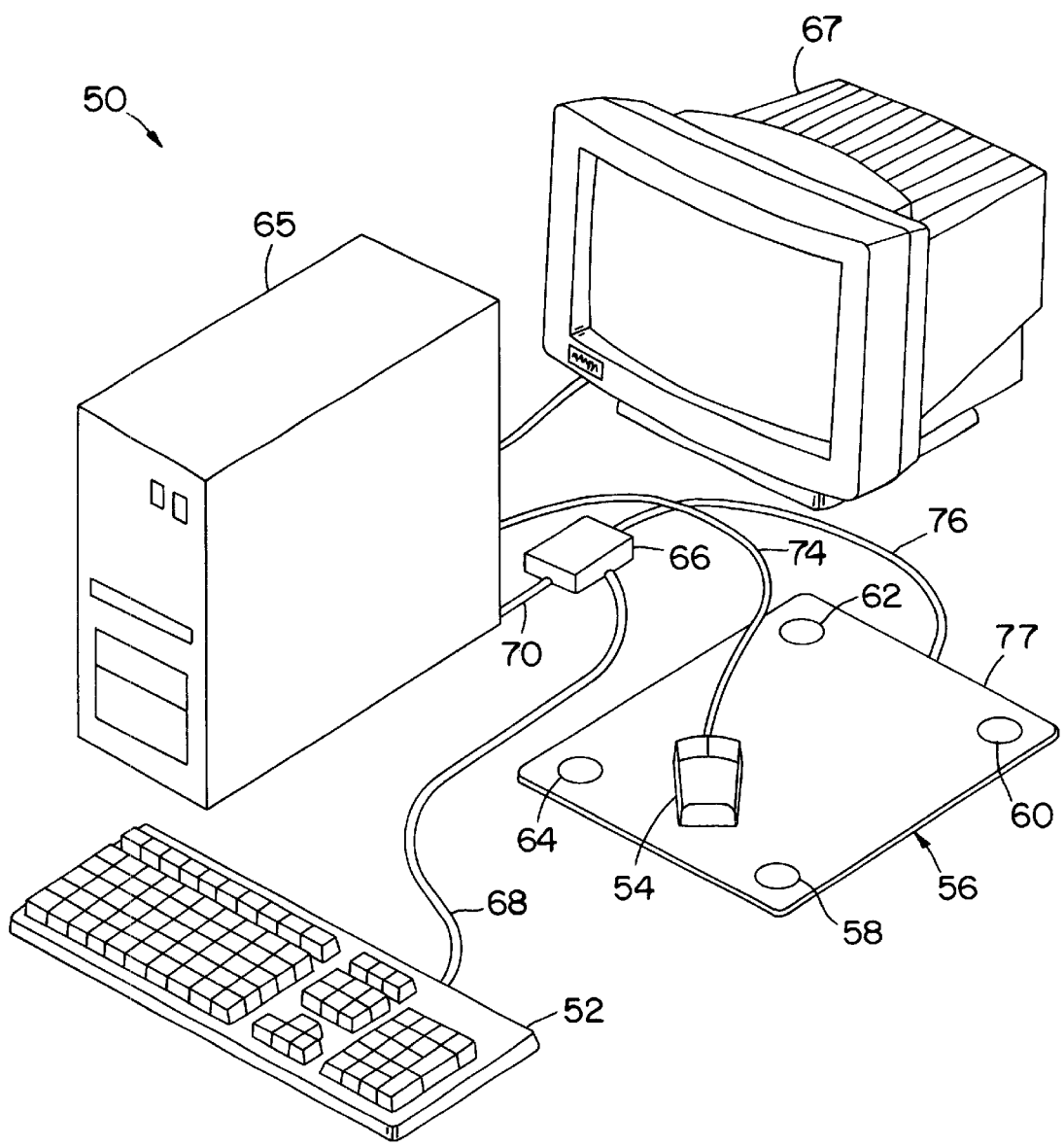
FIG. 1 is an isometric view of a first embodiment of a computer system including a mouse pad in accordance with the present invention.

A computer system 50 is illustrated in FIG. 1 and includes a keyboard 52 and a computer mouse 54 for providing input signals to the computer system 50, a mouse pad 56 for supporting the mouse 54 and including button pads 58, 60, 62, 64 for allowing software programs or applications operating or running on a computer 65 to be initiated or controlled via the mouse pad 56, and a connector box 66 for holding electronics and other circuitry needed to connect the mouse pad 56 to the computer 65 and, more specifically, for allowing the button pads 58, 60, 62, 64 to appear or be treated by the computer 65 like keys on the keyboard 52, particularly programmable function keys on the keyboard 52. A conventional computer display or screen 67 may also be used with or included in the computer system 50.

The keyboard 52 is preferably connected via a conventional keyboard cable 68 to electronic circuitry in the connector 66 which is, in turn, preferably connected via a cable 70 to a conventional keyboard port of the computer 65. The mouse 54 is preferably connected by a conventional mouse cable 74 to a conventional mouse port of the computer 65. The mouse pad 56 is preferably connected to the electronic circuitry contained in the connector 66 via cable or wires 76, but the mouse pad 56 may be connected to the electronic circuitry in the connecter 66 via an optical or other wireless link. The electronic circuitry in the connector 66 combines, intermixes, multiplexes, or otherwise transmits commands or signals generated by the keyboard 52 on the cable 68 and commands or signals generated by the mouse pad 56 on the cable 76 to be interwoven, multiplexed or otherwise transmitted on the cable 70 which is connected to a conventional keyboard port on the back of the computer 65. Therefore, signals created by the mouse pad 56 on the cable 76 can look like conventional or encoded keyboard strokes or key presses, commands, or signals on the cable 70 to the computer 65 and to any operating system software or application software operating or running on the computer 65.

A significant feature of the mouse pad 56 of the present invention is that it allows computer programs or other portions of computer software on the computer 65 to be initiated, launched, loaded, run, controlled, etc. from the mouse pad 56 via the button pads 58, 60, 62, 64 while not hindering operation, use, or movement of the mouse 54 on the mouse pad 56. That is, the button pads 58, 60, 62, 64 can be located or positioned anywhere on the usable area of the mouse pad 56, but preferably do not extend above the top surface 77 of the mouse pad 56 so as not to inhibit use or movement of the mouse 54 on the mouse pad 56. The mouse pad 56 is also preferably flexible and liquid resistant and may otherwise appear and function as a conventional mouse pad. As will be described in more detail below, the button pads 58, 60, 62, 64, when depressed or upon the application of applied pressure, complete an electric or electronic connection or circuit within the mouse pad 56 such that a signal is sent via the cable or wires 76 to the electronic circuitry located in the connector 66 and, as a result, a signal set from the connector 66 to the keyboard port of the computer 65 via the cable 70 indicating the depression of the button pad, such that the button pads 58, 60, 62, 64 can act as programmable keys similar to a programmable function key on a conventional computer keyboard. Software resident and operating on the computer 65 can be programmed or set such that the application of sufficient pressure on any one of the button pads 58, 60, 62, 64 will initiate, load, control, or run a software program on the computer 65 or so that the computer 65 will treat depression of any one of the button pads 58, 60, 62, 64 as a function key similar to programmable function keys on a conventional computer keyboard. Programming of a conventional function key or other programmable key on a conventional keyboard is well known to persons of ordinary skill in the art The structure of the mouse pad 56 and, more specifically, the button pads 58, 60, 62, 64 and their corresponding switches or circuitry in the mouse pad 56 are preferably layered or otherwise designed such that merely rolling or otherwise moving the mouse 54 over a button pad will not inadvertently activate the button pad's corresponding switch in the mouse pad 56, such that an electrical signal is created on the cable 76 by the mouse pad 56 or on the cable 70 by the connector 66. That is, in order to activate any of the switches in the mouse pad 56 corresponding to any of the button pads 58, 60, 62, 64, concentrated pressure or a downward operating force must be applied to the button pads 58, 60, 62, 64 that is preferably larger than the typical downward pressure or operating force applied by a computer mouse on a mouse pad as the computer mouse is moving or resting on the top surface of the mouse pad 56, as will be discussed in more detail below.

Figure 2:
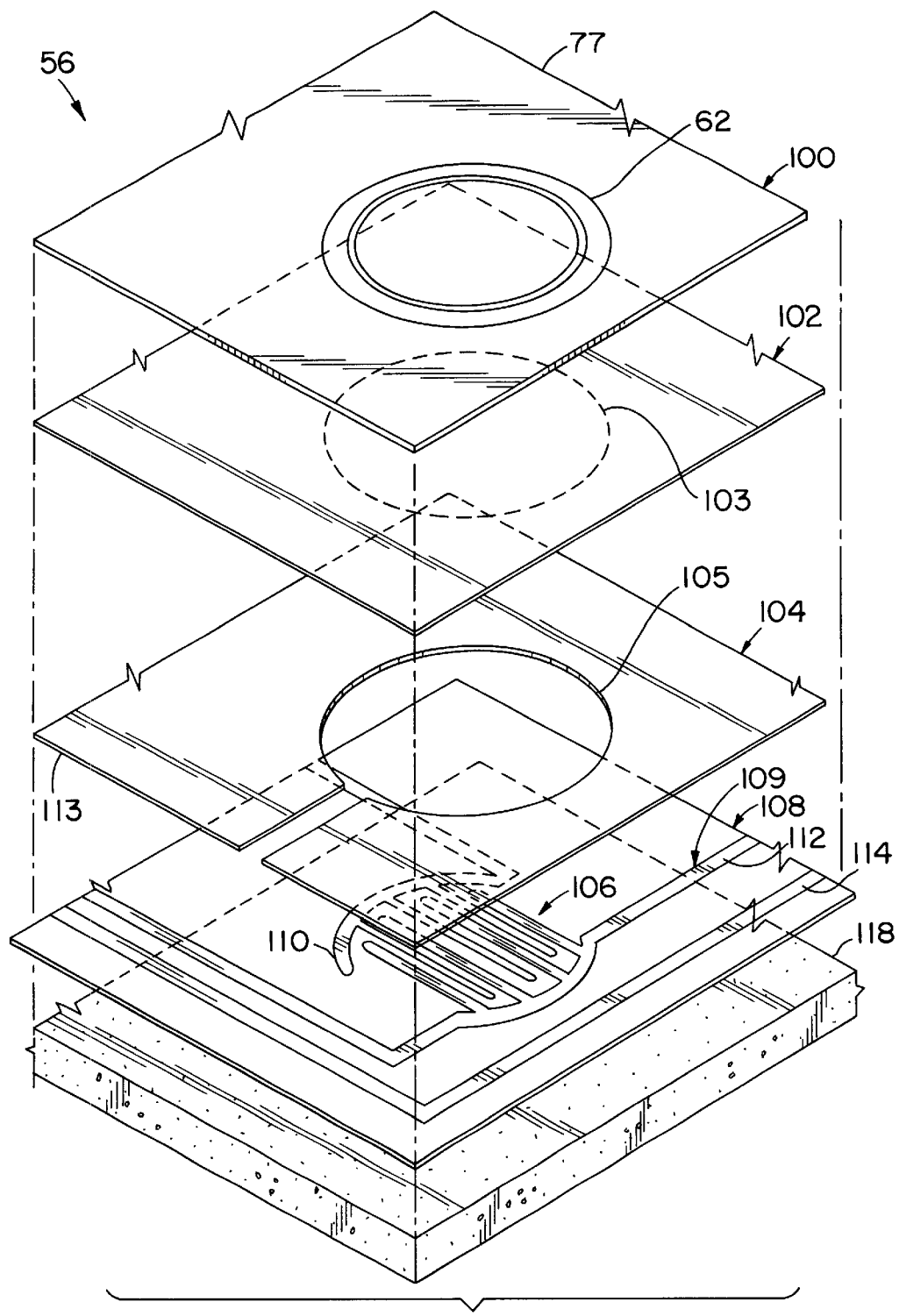
FIG. 2 is an exploded view of a section of the mouse pad of FIG. 1 illustrating the layers of the mouse pad.

Now referring to FIG. 2, a detailed portion of an exploded section of the mouse pad 56 is shown with particular emphasis on the button pad 62 and its corresponding switch or circuit structure in the mouse pad 56. Please note, however, that while only the button pad 62 will be discussed in further detail, the layers of the mouse pad 56 are also similarly configured for the button pads 58, 60, 64.

The mouse pad 56 preferably includes several layers, such as a surface layer 100 comprised of plastic, rubber, silicone, neoprene, polyester (such as melinex® material or mylar® material), polyurethane, polycarbonate (such as Lexan® material) or other material that is preferably flexible, durable, resistant to wear created by the mouse 54 as the mouse is moved around on the surface layer 100, and liquid resistant. The surface layer 100 forms the top surface 77 of the mouse pad 56 and preferably has a thickness between 0.005 inches and 0.015 inches and is optimally approximately 0.011 inches. The button pads 58, 60, 62, 64 may form a portion of the surface layer 100 such that the surface layer 100 forms one continuous, singular, or homogenous piece of material or such that button pads 58, 60, 62, 64 are integrated as part of the surface layer 100, preferably without extending above the surface layer 100 or the top surface 77 of the mouse pad 56. That is, as previously discussed above, the button pads 58, 60, 62, 64 preferably do not extend above the remainder of the surface layer 100 so as not to hinder or limit movement of a computer mouse on the top surface 77 of the mouse pad 56. Alternatively, the button pads 58, 60, 62, 64 may include or comprise additional material different from the remainder of the surface layer 100. Preferably the button pads 58, 60, 62, 64 comprise areas of a uniform surface layer 100 and are distinguished from the remainder of the surface layer 100 by graphics or other markings printed on the surface layer 100. If desired, the surface layer 100 may include graphic, advertising, or other printed material on it, some or all of which may describe the purpose and use of the button pads 58, 60, 62, 64, and some or all of which may extend above the surface layer 100. Alternatively, the printed material may be printed or located on the underside of the surface layer 100, being viewable through the surface layer 100 if the surface layer 100 is clear or transparent, may be printed or located on a separate layer, such as a sheet of paper, that is bonded to the underside of the surface layer 100 with a transparent adhesive, such that the separate layer is positioned between the layers 100, 102. In this third example, the surface layer 100 includes two distinct layers, namely a clear or transparent surface layer and a printed paper layer immediately underneath it.

The mouse pad 56 preferably includes a conductor layer 102 having an electrically conductive region or portion 103 while the remaining portion or area of the conductor layer 102, except for the similar conductive regions in the conductor layer 102 associated with the button pads 58, 60, 64 is preferably non-electrically conductive. The conductive region 103 is preferably comprised of copper, aluminum, or other metallic or electrically conductive material while the remaining portion of the conductor layer 102 is preferably comprised of rubber, plastic, silicone, adhesive material, polyester (such as melinex® material or mylar® material), neoprene, polyurethane, or other non-electrically conductive material.

The conductive region 103 of the conductor layer 102 is preferably aligned with the button pad 62 on the layer 100 and preferably, but not necessarily, has the same size and shape as the button pad 62. As will be discussed in more detail below, the conductive region 103, when forced or moved away from the layer 100 toward layer 104 as a result of downward pressure placed on or applied to the button pad 62, will create an electrical connection or short circuit indicating activation or use of the mouse pad 56 by the button pad 62, thereby creating a signal on the cable 76 indicating depression of the button pad 62 and, as a result, creating a signal on the cable 70 indicating depression of the button pad 62 that can be received or detected by the computer 65. The signal created by the connector 66 on the cable 70 may be the same as or different from the signal created on the cable 76 by the mouse pad 56. The conductor layer 102 is preferably bonded, glued, or adhesively attached to the surface layer 100 and preferably has a thickness between 0.002 inches and 0.01 inches and optimally has a thickness of approximately 0.006 inches such that the mouse pad 56 does not inadvertently indicate depression of the button pad 62 created by inadvertent contact between the conductive region 103 and the conductive strips 110, 112. If desired, the conductive region 103 may have a thickness larger than the thickness of the remainder of conductor layer 102 such that the conductive region 103 extends outward from the conductor layer 102 on either or both sides of the conductor layer 103 to help insure activation or indication of use of the mouse pad 56 when sufficient downward pressure is applied to the button pad 62.

The mouse pad 56 also preferably includes a non-conductive layer or barrier 104 having a hole, opening, or cut-out 105 extending through the layer 104. The hole 105 in the layer 104 is preferably aligned with the conductive region 103 of the layer 102 and the button pad 62 when the layers 100, 102, 104 are bonded or connected together. In addition, the hole 105 preferably, but not necessarily, has the same size and shape as the conductive region 103. The layer 104 forms a barrier between the layer 102 and a conductor layer 108 and, as a result, keeps the conductive region 103 for the button pad 62 distally away or sufficiently separated from a conductive pad 106 in the conductor layer 108 when downward pressure is not being applied to the button pad 62, but allows the conductive region 103 to contact and electrically connect or short portions of the conductive pad 106 of the layer 108 when sufficient concentrated downward pressure is applied to the button pad 62, as will be described in more detail below. The layer 104 can be comprised of a rubber, plastic, silicone, adhesive material, polyester (such as melinex® material or mylar® material), neoprene, polyurethane, or other material. The layer 104 is preferably bonded, adhesively attached, or glued to the conductor layer 102 and preferably has a thickness between 0.002 inches and 0.01 inches and has an optimal thickness of approximately 0.005 inches. While the layer 104 is shown as essentially a sheet or layer of material, a barrier between the layers 102, 108 can be created by a variety of configurations. For example, the layer 104 may comprise a number of distinct or separate strips of material positioned between the layers 102, 104. Therefore, the layer 104 may be interpreted as including any combination of one or more pieces of material positioned between the layers 102, 108 to create a space or separation between the layers 102, 108 and, more particularly, a space or separation between the conductive strips 110,112 and the electrically conductive region 103. In addition, the opening, hole, or cut-out 105 may form part of the periphery or perimeter 113 of the layer 104 and, as a result, may not form a completely or even substantially enclosed space or area.

The conductor layer 108 is preferably bonded or glued to the layer 104 and preferably includes at least two electrically conductive strips 110, 112. The conductive strips 110, 112 can be comprised of copper, aluminum, or other metallic or electrically conducting material. The remainder of the conductive layer 108 preferably comprises a plastic, rubber, or other non-electrically conducting material. The strips 110, 112 form a conductive pad 106 or other interlaced or dovetail design, but they are preferably not in electrical contact with each other when no downward pressure is being applied to the button pad 62 or the conductive region 103. However, the strips 110, 112 are preferably shaped or configured such that when sufficient concentrated pressure is applied to the button pad 62, the button pad 62 creates a downward pressure on the circular conductor 103 such that the conductive region 103 extends through the hole 105 in the layer 104 and makes electrical contact with both of the conductive strips 110, 112, thereby electrically connecting or shorting the strips 110, 112 during some or all of the duration of the applied downward pressure to the button pad 62. Thus, the conductive region 103 and the conductive strips 110, 112 form, in essence, a single-pole single-throw switch within the mouse pad 56 that is normally in an open position unless sufficient pressure is applied to the conductive region 103 via the button pad 62 such that the conductive strips 110, 112 are connected.

If one of the conductive strips 110, 112 is connected to a voltage, current, or other electric signal or source in the mouse pad 56 or the electronic circuitry in the connector 66, electrical connection or shorting of the conductors 110, 112 by the conductive region 103 allows an electric signal to be provided to or looped back to the electronic circuitry in the connector 66 via the cable 76, and, as a result, to the computer 65 via the cable 70, indicating that the button pad 62 has been depressed or otherwise activated. The layer 100, particularly the button pad 62, and/or the layer 104 are preferably resilient or "springy" enough such that removal of applied downward pressure to the button pad 62 will cause the button pad 62 to cease creating a downward pressure on the conductive region 103 such that the conductive region 103 no longer extends through the hole 105 in the layer 104 and such that the conductive region 103 no longer makes electrical contact with the conductive strips 110, 112. Thus, the surface layer 100 and the top surface 77 of the mouse pad 56 are preferably substantially or completely flat during periods when no significant downward pressure is being applied to the surface layer 100 or during periods of normal use of the computer mouse 54 on the mouse pad 56. The conductive layer 108 preferably has a thickness between 0.002 inches and 0.01 inches and optimally has a thickness of approximately 0.004 inches.

Figure 3:
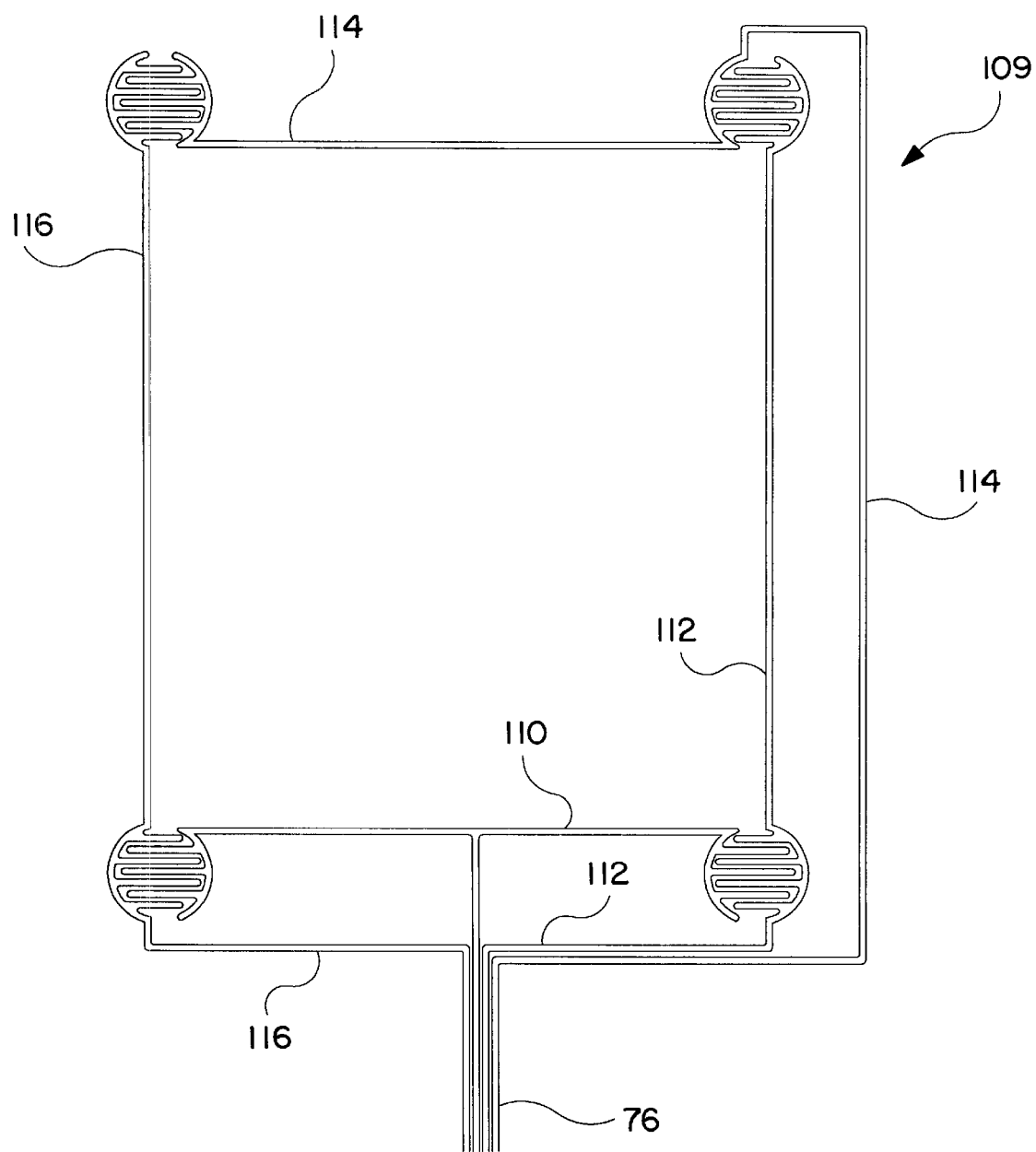
FIG. 3 is a top view of the conductive strips of the conductor layer in the mouse pad of FIG. 2.

As best illustrated in FIG. 3, the conductive layer 108 preferably contains an electrically conductive pattern 109 including four electrical conductive strips 110, 112, 114, 116, all of which are electrically connected to the electronic circuitry in the connector 66 via the cable or wires 76. Each of the button pads 58, 60, 62, 64, when depressed, will create an electrical connection or short circuit between different pair of the conductive strips 110, 112, 114, 116. As previously described above, depression of the button pad 62 or application of downward pressure to the button pad 62 will create electrical connection of the conductive strips 110, 112. Similarly, depression of the button pad 58 will electrically connect or short the conductive strips 114, 116, depression of the button pad 60 will create electrically connect or short the conductive strips 110, 116, and depression of the button pad 64 will electrically connect or short the conductive strips 112, 114. Preferably, the amount of downward pressure on the button pad 62 to electrically connect or short circuit the conductive strips 110, 112, is large enough to prevent inadvertent or premature electrical connection between the conductive strips 110, 112. The downward operating force needed on the button pad 62 to create electrical contact between the conductive strips 110, 112 and the conductive region 103 is at least two-hundred grams and preferably is between two-hundred and three-hundred grams. As will be discussed in more detail below, the electronic circuitry located in the connector 66 preferably can detect which two of the four conductive strips 110, 112, 114, 116 have been electrically connected or shorted when sufficient pressure is applied to any of the button pads 58, 60, 62, 64 and provide an appropriate or representative signal to the computer 65 via the cable 70 indicating which of the button pads 58, 60, 62, 64 has been depressed and which two of the conductive strips 110, 112, 114, 116 have been electrically connected or shorted. The signal sent by electronic circuitry on the connector 66 to the computer 65 may appear to the computer 65 as keyboard data, a keyboard depression, or other conventional keyboard keypress.

Referring back again to FIG. 2, the mouse pad 56 also preferably includes a bottom or base layer 118 which is comprised of a plastic or rubber material is which is preferably thicker relative to the other layers 100, 102, 104, 108 of the mouse pad 56 to provide support and durable structure to the mouse pad 56. The layer 118 is also preferably flexible and electrically non-conductive and can be comprised of a rubber, plastic, silicone, neoprene, polyester, polyurethane, or other material. The base layer 118 can be bonded or glued to the layer 108 and preferably has a thickness between 0.1 inches and 0.2 inches and optimally has a thickness of approximately 0.125 inches such that the mouse pad 56 has a sufficient support structure while also being flexible and potentially foldable.

Figure 4:
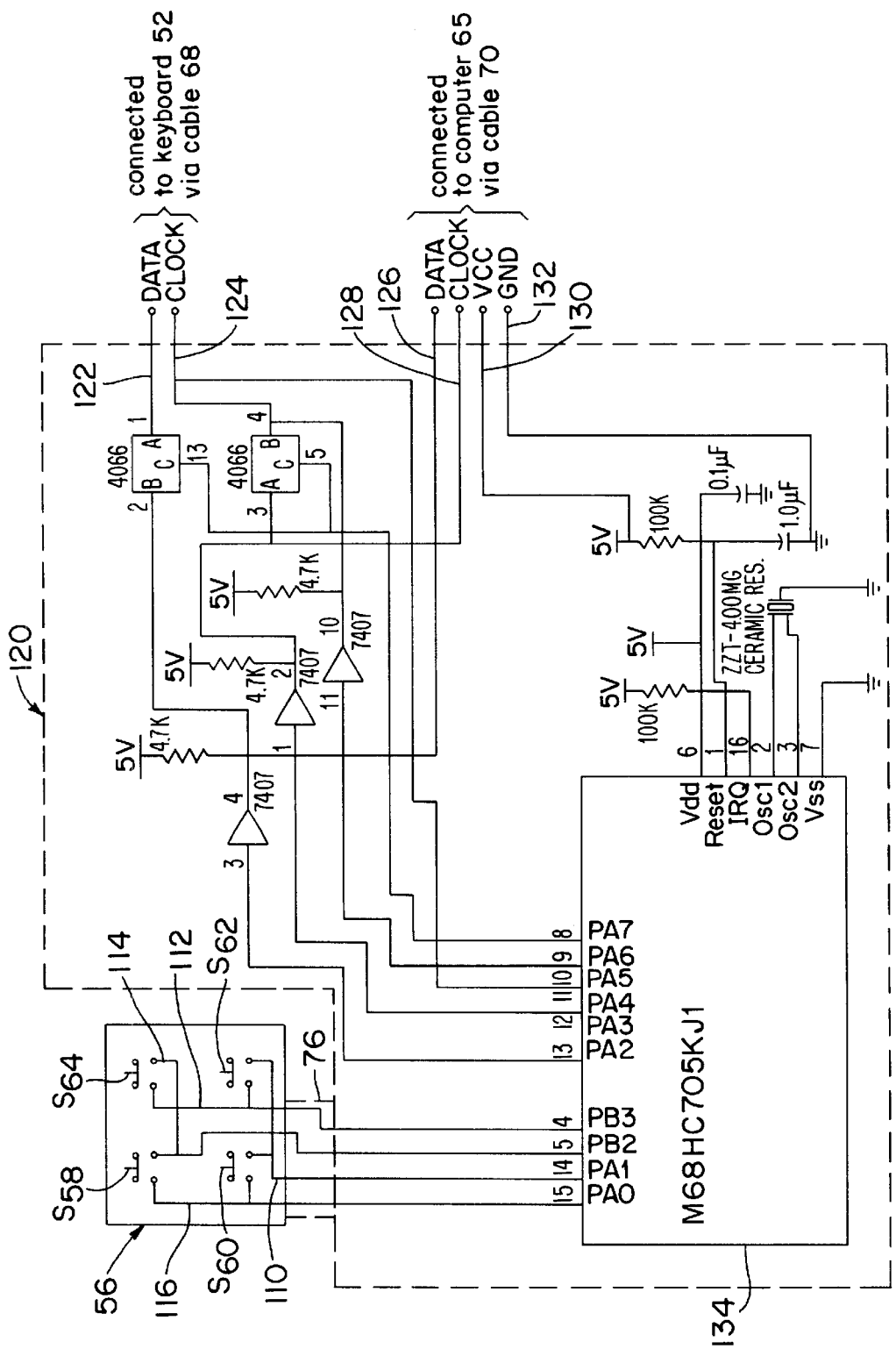
FIG. 4 is an exemplary schematic of the electronics and other circuitry used with the mouse pad of FIG. 1.

As previously discussed above, the conductive strips 110, 112, 114, 116 in the mouse pad 56 are electrically connected to electronic circuitry 120 in the connector 66 via the cable 76. An exemplary or representational electronic schematic for the electronic circuitry 120 located in the connector 66 is illustrated in FIG. 4. The electronic circuitry 120 includes the data node 122 and the clock or command node 124, which are connected to the keyboard 52 via the cable 68 and date node 126, clock or command node 128, $V_{cc}$ node 130, and ground (GND) node 132 which are connected to the computer 65 via the cable 70. The electronic circuitry 120 and the signals sent to the computer 65 from the electronic circuitry 120 are controlled by the microprocessor 134 which can be an M68HC705KJ1 microprocessor manufactured by the Motorola Corporation. In the exemplary circuit shown in FIG. 4, please note that the pattern of the conductive strips 110, 112, 114, 116 is not exactly the same as their pattern in FIG. 3 for ease of explanation and to simplify FIG. 4. The conductive strips 112 and 116 may have a voltage, current, or other specific signal or source applied to them which are received by the microprocessor 134 via the conductive strips 110, 114 when the illustrative switches $S_{58}$, $S_{60}$, $S_{62}$, $S_{64}$ corresponding to button pads 58, 60, 62, 64 respectively are depressed. The signals created by the microprocessor 134 on the conductive strips 112, 116 may be different so as to make it easier to determine which of the button pads 58, 60, 62, 64 has been depressed. Alternatively, the microprocessor 134 can create signals on other pairs or groups of the conductive strips 110, 112, 114, 116.

Figure 5:
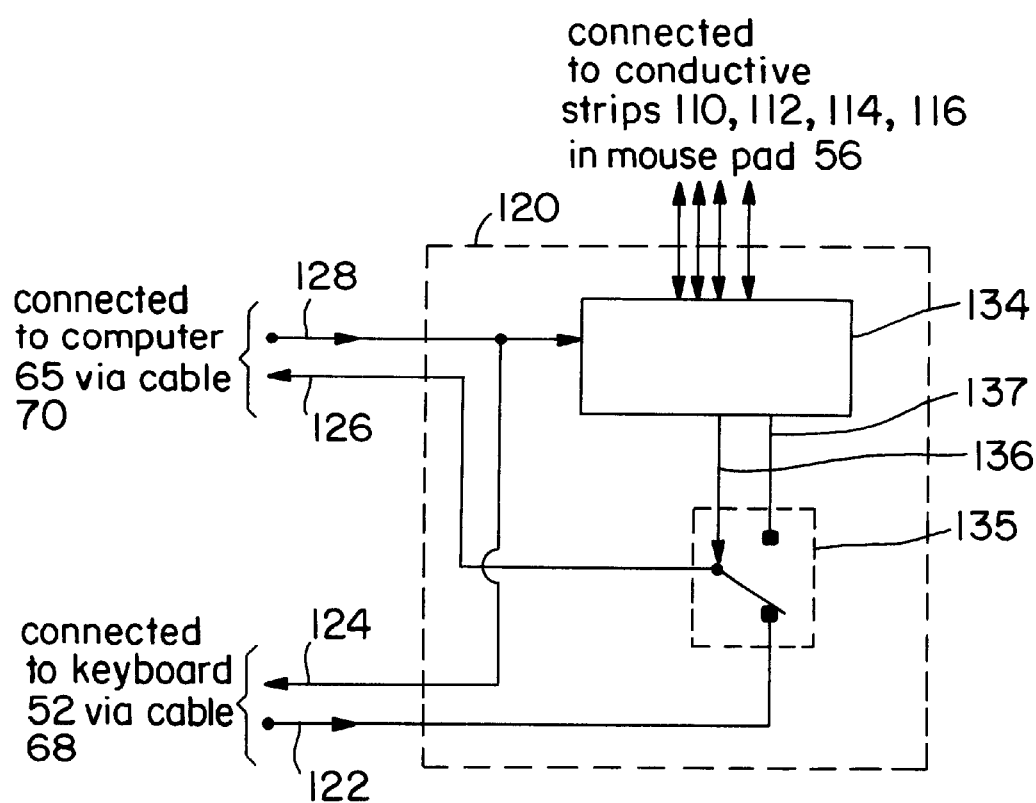
FIG. 5 is a simplified illustration of the schematic of FIG. 4.

For purposes of elaboration of the operation of electronic circuitry 120, a simplified representation of the electronic circuitry 120 is provided in FIG. 5. Please note that all of the components or nodes of the electronic circuitry in FIG. 4 are not shown in FIG. 5. In general, keypresses or keyboard strokes generated by or from the keyboard 52 on the cable 68 are directed to the switch 135 via the data node 122. The switch 134 operates as a single-throw double pole device and is preferably controlled by the microprocessor 134 via the control node 136. The microprocessor 134 can select via the switch 135 whether the computer 65 will receive data from the keyboard 52 or from the microprocessor 134 itself. In most cases, the switch 135 will be set or positioned by the microprocessor 134 via the control node 136 so that the data node 122 is electrically connected to the data node 126 which, in turn, is connected to the computer 65 via the cable 70. The computer 65 may send clock or other signals to the microprocessor 134 via the clock or command node 128 which is also electrically connected to the clock or command node 124 by the electronic circuitry 120 such that the clock or other signals from the computer 65 on the control node 126 can also be sent to the keyboard 52 via the cable 68.

When the microprocessor 134 senses or detects that one or more of the button pads 58, 60, 62, 64 in the mouse pad 56 has been sufficiently depressed such that at least two of the conductive strips 110, 112, 114, 116 become temporarily electrically connected or shorted, the microprocessor 134 will either simultaneously or sequentially determine which of the button pads 58, 60, 62, 64 has been depressed, change the switch 135 such that the node 137 and the data node 126 are electrically connected, and generate an electric signal on the node 137 that is transmitted to the computer 65 via the data node 126 in the cable 70. While the signal generated by the microprocessor 134 may be any desired signal, the signal preferably appears as keyboard data, a keyboard depression or keypress, or other conventional keyboard signal. After such signal is sent to the computer 65 from the microprocessor 134 via the node 128, the microprocessor 134 preferably will change the switch 135 so that the data node 122 and the data node 126 are once again electrically connected and so that the node 137 and the data node 126 are no longer electrically connected. In this configuration, the microprocessor 134 preferably only electrically disconnects the data node 122 and the data node 126 when one or more of the button pads 58, 60, 62, 64 is depressed with enough pressure such that at least two of the conductive strips 110, 112, 114, 116 are electrically connected or shorted. Therefore, communication or transmission of keyboard presses or strokes from the keyboard 52 to the computer 65 are not unduly or unnecessarily delayed. Either the microprocessor 134 or software resident and operating on the computer 65 can be used to determine which of the button pads 58, 60, 62, 64 has been depressed.

Figure 6:
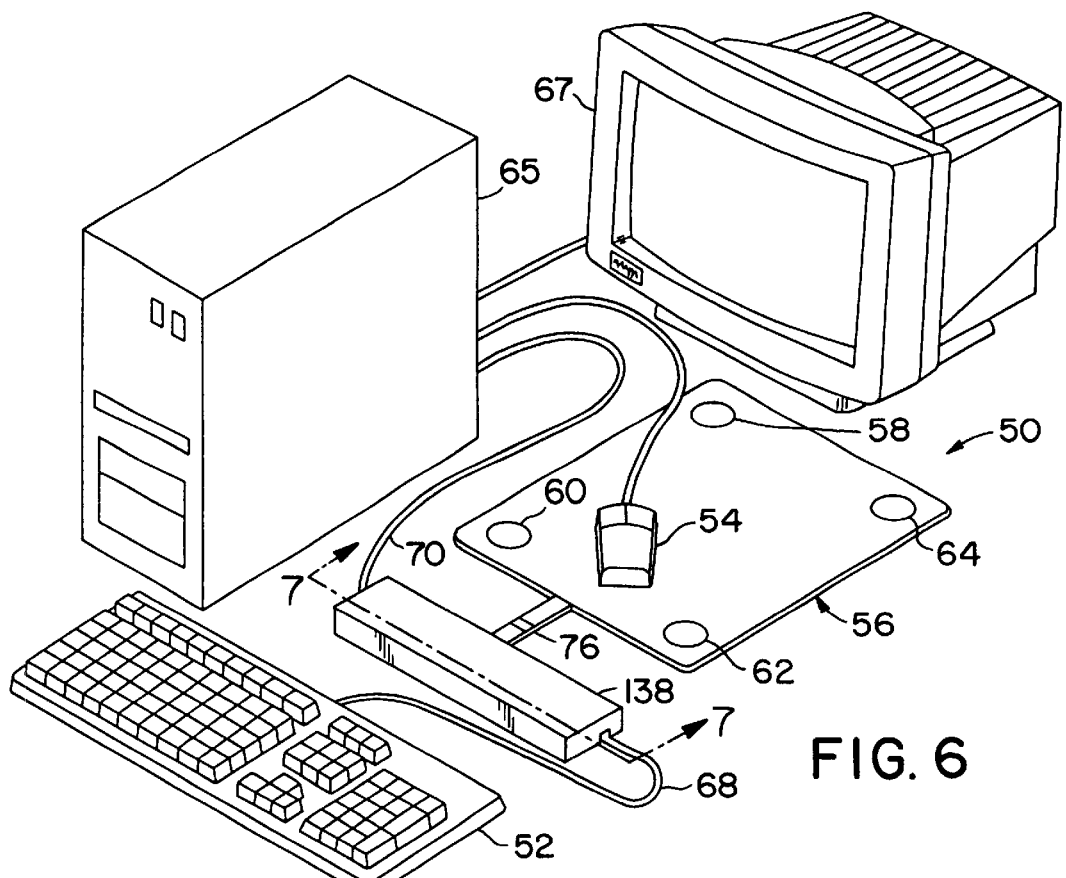
FIG. 6 is an isometric view of a second embodiment of a computer system including the mouse pad of FIG. 1.

Now referring to FIG. 6, a second embodiment of the computer system 50 is illustrated using the mouse pad 56, the keyboard 52, the mouse 54, the computer 65, and the display 67. Instead of a connector, such as the connector 66, the cables 68, 70, and 76 are electrically connected within a wrist rest 138 so that the user may have a place to rest his or her arm or wrist while using the mouse pad 56 and/or the mouse 52. The electronic circuitry in the wrist rest 138 works in a fashion similar to the first embodiment of the computer system 50.

Figure 7:
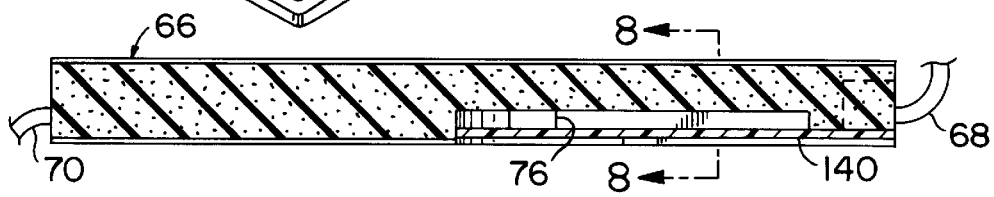
FIG. 7 is side cross-sectional view of the wrist rest of FIG. 6.
Figure 8:
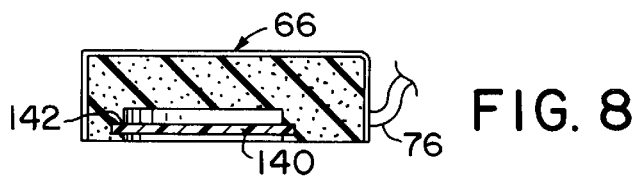
FIG. 8 is an end cross-sectional view of the wrist rest of FIG. 6, taken along the line 8—8 of FIG. 7.
Figure 9:
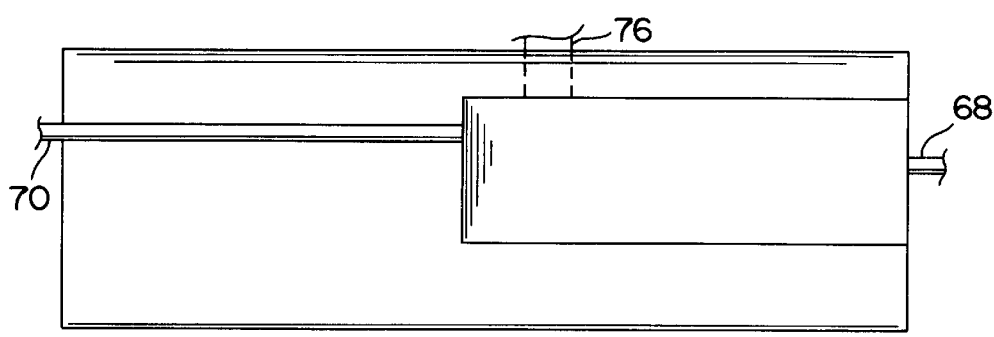
FIG. 9 is bottom view of the wrist rest of FIG. 6.

Now referring to FIGS. 7–9, the wrist rest 138 is preferably comprised of a rubber, plastic, or other material that is comfortable for a user when the user positions his or her arm or wrist on the wrist rest 138. The cables 68, 70, 76 extend into the wrist rest 138 and are electrically connected to electronic circuitry 120 located inside the wrist rest 138. While not shown in FIGS. 7-9, the electronic circuitry 120 can be positioned or located on printed circuit board 140 that is held in place within the internal lip 142 in the wrist rest 138.

During operation and use of the mouse pad 56, the mouse 54 is preferably used and moved along the top surface 77 of the mouse pad 56 in a conventional manner. A user of the system 50 may provide input to the computer 65 via the keyboard 52 and the mouse 54 just as in a conventional computer system. Preferably, the computer 65 has been programmed to treat the electronic signals created on the cable 76, and, as a result, the cable 70 via the application of concentrated pressure or downward operating force to any of the button pads 58, 60, 62, 64, in a manner similar to programmable keys or other keys on a conventional keyboard. Therefore, depression of any of the button pads 58, 60, 62, 64, will preferably be treated by the computer 65 as activation or depression of a programmable key on a conventional keyboard. Upon activation or depression of any of the button pads 58, 60, 62, 64 by the application of concentrated pressure to the button pads 58, 60, 62, 64, the function or software associated with the button pad will be activated, loaded, or run by the computer 65. For example, the computer 65 might be programmed to launch a browser such as the Netscape Communicator™ browser or the Microsoft Internet Explorer™ browser when the mouse pad 56 creates a signal on the cable 76 and as a result, when the electronic circuitry 120 creates a corresponding signal on the cable 70, due to the application of concentrated downward pressure on the button pad 58 that causes electrical connection of the conductive strips 114, 116. Moreover, the computer 65 might be programmed to create a browser session with a particular link or Uniform Resource Locator (URL) on the World Wide Web when particular button pad 62 is sufficiently depressed. As another example, the computer 65 might be programmed to launch or run a wordprocessor or other software application when concentrated pressure is applied to the button pad 60. Since the button pads 58, 60, 62, 64 can be treated by or appear to the computer 65 as programmable function keys or other keys on a conventional keyboard, the mouse pad 56 is not limited to use with any particular kind of computer software application, operating system, or computer architecture.

Figure 10:
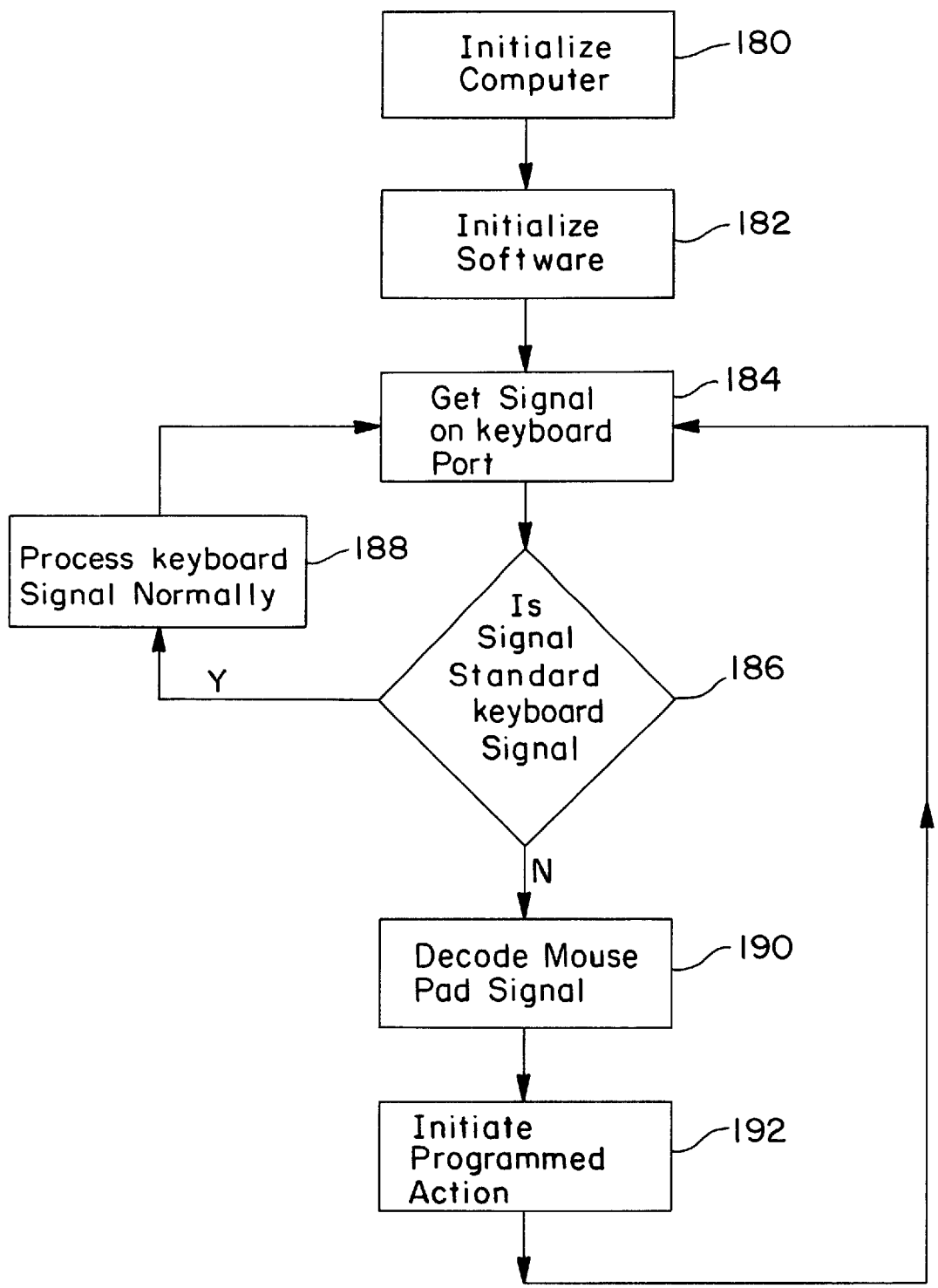
FIG. 10 is a flowchart of software operating on the computer in the computer system of FIGS. 1 and 6.

The general operation of software operating on the computer 65 is illustrated in FIG. 10 for a conventional use of the mouse pad 56. At first, the computer 65 is booted up and initialized during step 180. After the computer 65 is initialized, during step 182 the computer 65 preferably initializes or loads software operating on the computer 65 that interprets all signals appearing on the computer's keyboard part from the cable 70 and determines if the signals represent the depression of one of button pads 58, 60, 62, 64 on the mouse pad 56 or depression of one of the keys on the keyboard 52. The software loaded by the computer 65 during the step 182 also controls what happens when one of the button pads 58, 60, 62, 64 is sufficiently depressed. That is, associations are made between each button pad 58, 60, 62, 64 and a software program such that when one of the button pads 58, 60, 62, 64 are sufficiently depressed, the computer loads, initiates, runs, etc., the software program associated with the button pad.

After the computer and software are sufficiently initialized during steps 180, 182, during step 184, the computer 65 can now receive input signals from the keyboard 52 and the mouse 54, just as in a conventional computer or computer system, as well as input signals from the microprocessor 134 created by depression of one or more of the button pads 58, 60, 62, 64 on the mouse pad 56.

When the computer 65 detects or receives a signal on the keyboard port from the cable 70, the computer 65 will determine during step 186 if the signal represents a standard keyboard signal from the keyboard 52 via the cable 68 indicating that a key on the keyboard 52 has been depressed or if the signal represents a signal from the mouse pad 56 or the microprocessor 134 via the cable 76 indicating that one of the button pads 58, 60, 62, 64 has been sufficiently depressed. If the signal on the keyboard port detected or received by the computer 65 during the step 184 is a standard keyboard signal or otherwise indicates that the signal originated from the keyboard 52 and not the mouse pad 56 or the microprocessor 134, the computer 65 will process the signal in a conventional manner during step 188. If, however, the signal on the keyboard port detected or received by the computer 65 during the step 184 is not a standard keyboard signal or if the signal otherwise indicates that the signal originated from the microprocessor 134 or the mouse pad 56, the computer 65, during step 190, will decode the signal and determine which of the button pads 58, 60, 62, 64 were depressed or activated.

After the computer 65 determines during step 190 which of the button pads 58, 60, 62, 64 has been depressed during step 192, the computer 65 will load and/or initiate the software previously associated with the depressed button pad during the step 182. The software could be browser software and a URL for a World Wide Seb Site, a spreadsheet program, word processing software, a diagnostic tool, etc. The computer 65 then repeats the process to detect other signals generated by the keyboard 52 or the microprocessor 134 (as the result of sufficient depression of one of the button pads 58, 60, 62, 64). Alternatively, the computer 65 could suspend or stop initiating, running, etc. any software associated with a button pad until the software launched or initiated on the computer 65 during the step 192 is completed or halted.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow. For example, while only four button pads have been shown and described with the mouse pad 56, any number of button pads is possible and the button pads can be positioned anywhere on the mouse pad 56. In addition, while the electronic circuitry has been described herein as being located in the connector 66 or in wrist rest 138, all or some of the electronic circuitry 120 could be located in the mouse pad 56 itself. In fact, the connector 66 or wrist rest 138 could be eliminated without departing from the scope of the present invention by incorporating all of the electronic circuitry 120 directly into the mouse pad 56. The wires or cables 68, 70, 74, 76 may be of different lengths to accommodate desired orientation of placement of the connector 66, the mouse pad 56, the mouse 54, the computer 65, or the wrist rest 138.

In addition to the above the conductive strips 110, 112, 114, 116 in the layer 108 may have any desired configuration, pattern, or shape and can form contact pads of any desired configuration pattern or shape. The button pad 62, conductive region 103, and hole 105 can have any desired sizes or shapes and they do not necessarily need to have the same shape or size or completely overlap. Other layers can also be added to the mouse pad 56 as needed, particularly if it is desired to have conductive strips on different layers or if it is desired to have different button pads require different levels of concentrated pressure to activate the mouse pad 56. The mouse pad 56 may also have a grid imprinted or included on it so that it can be used with both an optical mouse and a mechanical mouse. Furthermore, the mouse pad 56 is preferably substantially flexible such that it can be at least partially rolled up, curved, or twisted without breaking or cracking and while maintaining its operational functions and characteristics.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof The embodiments of the invention in which an exclusive property or privilege is claimed are defined as follows:

1. A mouse pad having a substantially flat and flexible top surface for supporting mouse means for communicating with a computer from anywhere on said top surface, said mouse pad comprising:
   a base layer;
   a first layer coupled to said base layer and including a first electrically conductive strip and a second electrically conductive strip;
   a second layer having at least one opening extending trough it or formed at the perimeter of said second layer, said second layer being coupled to said fit layer such that said opening is positioned over at least a portion of said first conductive strip and at least a portion of said second conductive strip; and
   a third layer normally separated from said first layer by said second layer and having at least one electrically conductive region located anywhere on said third layer, said third layer coupled to said second layer such that at least a portion of said conductive region of said third layer is positioned over or adjacent at least a portion of said opening of said second layer, wherein upon application of at least a threshold pressure to said conductive region of sad third layer, such that said conductive region of said third layer is moved toward said first layer, said conductive region of said third layer extends at least partially through said opening in said second layer and contacts both said first conductive strip and said second conductive strip;
   whereby upon said computer being placed in communication with one of said first and second conductive strip, a signal is generated by contacting said first and second conductive strip with said third layer to cause at least one of initiating, loading, controlling or running a software program on a computer.

2. The mouse pad of claim 1, including a surface layer having a bottom surface coupled to said second conductor layer.

3. The mouse pad of claim 1, wherein said third layer includes non-electrically conductive material.

4. The mouse pad of claim 1, wherein said second layer includes non-electrically conductive material.

5. The mouse pad of claim 1, wherein said first conductive strip and said second conductive strip form a contact pad in said first layer.

6. The mouse pad of claim 1, wherein said first layer includes a third electrically conductive strip and a fourth electrically conductive strip.

7. The mouse pad of claim 6, wherein said first conductive strip and said third conductive strip form a contact pad in said first layer.

8. The mouse pad of claim 7, wherein said second conductive strip and said fourth conductive strip from a contact pad in said first layer.

9. The mouse pad of claim 6, wherein said second layer includes a second opening extending through said second layer or forming part of the perimeter of said second layer and said second layer is coupled to said first layer such that said second opening is positioned over or adjacent at least a portion of said first conductive strip and at least a portion of said third conductive strip.

10. The mouse pad of claim 9, wherein said third layer includes a second conductive region, said second layer being coupled to said third layer such that said second conductive region is positioned over at least a portion of said second opening of said second layer, wherein upon application of pressure to said second conductive region of said third layer, said second conductive region of said third layer extends at least partially through said second opening in said second layer and contacts both said first conductive strip and said third conductive strip.

11. The mouse pad of claim 1, wherein said second layer has a thickness greater than or equal to 0.002 inches.

12. The mouse pad of claim 1, wherein said third layer has a thickness greater than or equal to 0.002 inches.

13. The mouse pad of claim 1, wherein said base layer has a thickness greater than or equal to 0.1 inches.

14. The mouse pad of claim 1, wherein said threshold pressure is greater than or equal to two-hundred grams of operating force.

15. The mouse pad of claim 1, wherein said first conductive strip and said second conductive strip are distinct and non-contacting within said first layer.

16. The mouse pad of claim 2, wherein said surface layer has a substantially flat top surface.

17. The mouse pad of claim 16, wherein said bottom surface of said surface layer is substantially flat.

18. The mouse pad of claim 2, wherein said surface layer has a thickness greater than or equal to 0.05 inches.

19. An attachment to a computer, comprising a mouse pad having a substantially flat and flexible top surface for supporting mouse means for communicating with said computer from anywhere on said top surface, said mouse pad having at least one depressible portion contained substantially or entirely anywhere within said mouse pad, said mouse pad being electrically connectable to a keyboard and a keyboard port on the computer such that depression of at least one depressible portion causes a first signal to be transmitted to the computer and depression of a key on said keyboard causes a second signal to be transmitted to the computer, wherein said mouse pad includes a flexible base layer, a fist conductor layer coupled to said base layer and including a first conducting strip and a second conductive strip, a non-conductive layer normally separating said flat top surface and said first conductor layer and having at least one hole extending through it, said nonconductive layer being coupled to said first conducive layer such that said hole is positioned over at least a portion of said first conductive strip and at least a portion of said second conductive strip;
thereby depressing on one of said depressible portion of said mouse pad to generate an electrical signal for initiating, loading, controlling or running a software program on a computer.

20. The attachment of claim 19, wherein said mouse pad includes a plurality of depressible portions and the depression of each of said plurality of depressible portions appears as at least one keyboard stroke or keypress to the computer.

21. The attachment of claim 19, wherein the computer is programmed such that said depression of said at least one depressible portion pad initiates or controls loading, running, or operation of software in the computer.

22. The attachment of claim 19, wherein said base layer includes rubber material.

23. The attachment of claim 19, wherein said mouse pad includes a second conductor layer having at least one conductive region, said second conductor layer couple to said non-conductive layer such that said conductive region is positioned over at least a portion of said hole of said non-conductive layer, wherein upon application of at least a first pressure to said conductive region of said second conductor layer, said con region of said second conductor layer contacts both said first conductive strip and said second conductive strip.

24. The attachment of claim 23, wherein said first pressure is greater than or equal to an operating force of two hundred grams.

25. The attachment of claim 23, wherein said second conductor layer includes non-electrically conductive material.

26. The attachment of claim 19, wherein said non-conductive layer includes plastic material.

27. The attachment of claim 19, wherein said mouse pad is substantially flexible.

28. An apparatus, comprising a mouse pad having a top layer with a substantially flat and flexible top surface for supporting mouse means for communicating with a computer from anywhere on said top surface, said mouse pad including a second layer having at least two electrically conductive areas normally separated from said top surface and a first switch that electrically connects said two electrically conductive areas when a force greater than or equal to a threshold farce is exerted on at least a portion of said top surface located anywhere thereon such that said portion of said top surface is directed toward both said two electrically conductive areas;
whereby upon said computer being placed in communication with one of said two conductive areas, a signal is generated by electrically connecting said two conductive areas to cause at least one of initiating, loading, controlling or running a software program on a computer.

29. The apparatus of claim 28, wherein said top surface is substantially flat.

30. The apparatus of claim 28, wherein said first switch is substantially or completely embedded or contained within said pad.

31. The apparatus of claim 28, including an electric circuit capable of coupling said two electrically conductive areas to a computer such that said electrical connection of said two electrically conductive areas can be detected by said computer.

32. The apparatus of claim 28, including a third electrically conductive area and a second switch that electrically connects said third electrically conductive area and at least one of said two electrically conductive areas when a force greater than or equal to said threshold force is applied to at least a portion of said top surface such that at least a portion of said top surface is directed toward said third electrically conductive area.

33. The apparatus of claim 32, wherein said second switch is substantially or completely embedded or contained within said pad.

* * * * *